(12) United States Patent
Olmedo

(10) Patent No.: US 7,793,613 B2
(45) Date of Patent: Sep. 14, 2010

(54) COMPONENTS OF A MILKING MACHINE, MILKING MACHINE AND MILKING DEVICE FOR MILKING ANIMALS

(75) Inventor: Juan Olmedo, Oelde-Lette (DE)

(73) Assignee: GEA Farm Technologies GmbH, Bonen (DE)

(*) Notice: Subject to any disclaimer, the term of this patent is extended or adjusted under 35 U.S.C. 154(b) by 72 days.

(21) Appl. No.: 11/661,043

(22) PCT Filed: Sep. 2, 2005

(86) PCT No.: PCT/EP2005/009454

§ 371 (c)(1),
(2), (4) Date: Oct. 16, 2007

(87) PCT Pub. No.: WO2006/027168

PCT Pub. Date: Mar. 16, 2006

(65) Prior Publication Data

US 2008/0134978 A1  Jun. 12, 2008

(30) Foreign Application Priority Data

May 7, 2004  (DE) .................. 10 2004 043 604

(51) Int. Cl.
*A01J 5/00*  (2006.01)
(52) U.S. Cl. .................................... 119/14.14
(58) Field of Classification Search .............. 119/14.14, 119/14.47, 14.51
See application file for complete search history.

(56) References Cited

U.S. PATENT DOCUMENTS

| | | | | |
|---|---|---|---|---|
| 5,957,081 A | * | 9/1999 | van der Lely et al. | 119/14.09 |
| 2007/0277737 A1 | * | 12/2007 | Maier et al. | 119/14.45 |

FOREIGN PATENT DOCUMENTS

| | | |
|---|---|---|
| DE | 32 17 443 A1 | 12/1982 |
| DE | 86 32 740.2 U1 | 11/1987 |
| DE | 30 44 445 C2 | 8/1989 |
| DE | 38 18 116 A1 | 11/1989 |
| EP | 0 347 004 A1 | 12/1989 |
| EP | 0 468 588 A1 | 1/1992 |
| EP | 0 468 588 A1 | 11/1999 |
| GB | 2 098 847 A | 12/1982 |
| WO | WO 2005/094566 A1 | 10/2005 |

OTHER PUBLICATIONS

English language Abstract, Translated Description and Claims of DE 38 18 116 A1, European Patent Office's esp@cenet.com database, 4pp.
English language Translated Description and Claims of DE 86 32 740.2, European Patent Office's esp@cenet.com database, 2pp.
English language Translated Description and Claims of FR 2472337 A1 (corresponding to DE 30 44 445 C2, European Patent Office's esp@cenet.com database, 5pp.

* cited by examiner

*Primary Examiner*—Yvonne R. Abbott
(74) *Attorney, Agent, or Firm*—Smith Law Office

(57) ABSTRACT

The invention relates to a component of a milking machine, particularly of a milking machine having at least one teat cup and a milking collecting piece, with a housing. The inventive component comprises at least one activating unit by means of which at least one activating signal is provided.

13 Claims, 2 Drawing Sheets

Figure 1:
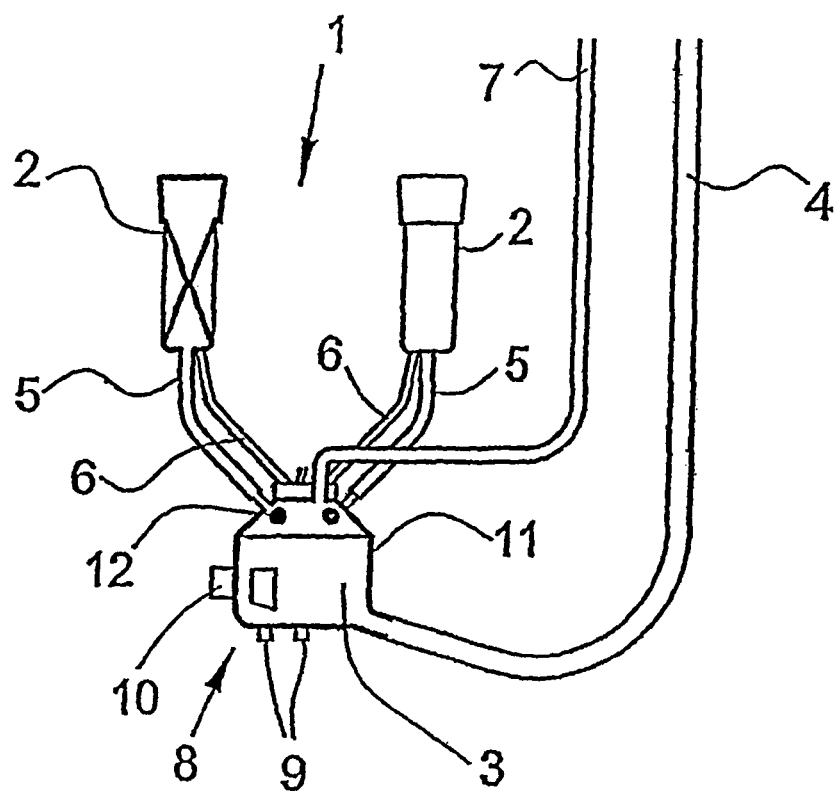

COMPONENTS OF A MILKING MACHINE, MILKING MACHINE AND MILKING DEVICE FOR MILKING ANIMALS

FIELD AND BACKGROUND OF THE INVENTION

The subject matter of the invention relates to a component of a milking cluster, to a milking cluster for milking an animal and to a milking device.

For milking animals, milking devices which have milking stalls at which the milking operation takes place have been developed. For this purpose, the teat cups of a milking cluster are attached to the teats of the animal. Before the actual milking operation, stimulation of the animal may be carried out to increase the willingness of the animal to be milked. The milking operation and the milking process may be started manually. For this purpose, each milking stall is equipped with a corresponding terminal. From this terminal, the milker can also call up data on the animal located at the milking stall.

Milking devices in which the milking operation is automatically started are also known. The starting operation is initiated by picking up the milking cluster. In the initial position, the milking cluster is on a holder, which is equipped with a corresponding switch. If the milking cluster is removed from the holder by the milker, the switch is activated and the milking operation is initiated.

The automatic starting of a milking operation has the disadvantage that this milking operation takes place at too early a time and that not inconsiderable amounts of air are sucked in through the teat cups. The vacuum system of the milking machine must be correspondingly designed.

If the start of a milking operation takes place by means of a terminal, this takes up a not inconsiderable amount of time for a milker.

Against this background, the present invention is based on the object of designing a component of a milking cluster in such a way that starting a milking operation is made easier.

SUMMARY OF THE INVENTION

The inventive component of a milking cluster, in particular a milking cluster comprising at least one teat cup and a milk collecting piece, with a housing, is distinguished by the fact that the component has at least one activating unit, by means of which at least one activating signal is provided. This inventive refinement of the component at least makes the starting procedure of a milking operation easier. The milker has the possibility at least of starting the milking operation during the procedure of attaching the teat cup or after completion of the attaching procedure, without having to use a terminal.

The activation can take place in various ways. In particular, it is proposed that the at least one activating unit can be manually activated. This measure ensures that unintentional activation of the activating unit is avoided.

According to an advantageous refinement of the component according to the invention, it is proposed that the activating unit has at least one actuating element. Such an actuating element may be, for example, a button. The button may take various forms. For example, the button may be a spring-loaded switch. It may also comprise a pressure-sensitive sensor, so that a switching operation is initiated by exerting a pressure on the button. In addition, there is the possibility that the button is formed by proximity sensors and/or optical sensors.

The activating unit may also have a number of actuating elements, to which different functionalities are assigned. For example, an actuating element by which, for example, an activating signal for providing a vacuum is generated may be provided. Another actuating element may be used for generating a signal by which a pulsator is activated or deactivated.

In order to avoid the activating unit being activated unintentionally, it is proposed that the activating unit has at least one enabling button. The enabling button is preferably formed in such a way that the actuating elements can only be activated when the enabling button is in an enabling position. Preferred for this is a refinement of the enabling button which automatically returns the enabling button from an enabling position into a disabling position. In this disabling position, the enabling button blocks the actuating elements, so that even when the actuating elements are actuated they do not become active.

A refinement of the component in which the activating unit, in particular the actuating element, is ergonomically arranged on the housing is particularly preferred. The ergonomic arrangement is preferably chosen such that the operator intuitively takes hold of the component or the housing in such a way that at least one of the operator's fingers comes to lie against an actuating element.

In order that possible operating states of the milking cluster can be made verifiable for the operator, according to a still further advantageous refinement of the invention it is proposed that the component has at least one signalling unit. The signalling unit signals to the operator that, for example, a milking process has been started. The signalling unit may also be used for indicating possible improper operation or malfunctions occurring at the milking cluster. The indication may take place optically. For example, the signalling unit may have a lamp which lights up when the milking cluster is activated. In the event of a malfunction, the lamp may flash for example. Apart from an optical indication, or instead of it, the signalling unit may also have an acoustic indication. The acoustic indication may also be used for acoustically confirming the actuation of the actuating elements.

According to yet another advantageous refinement of the component, it is proposed that the at least one activating unit can be acoustically activated. A voice-controlled activating unit may be concerned here. Activation or deactivation of the activating unit may take place by means of simple voice commands, such as for example "start" and "stop".

The component according to the invention is preferably a milk collecting piece. In particular, it is proposed that the activating unit is arranged on an underside of the housing of the milk collecting piece.

The component according to the invention may also be a teat cup. There is also the possibility that each teat cup is equipped with an activating unit, so that teat-individual milking operations can also be initiated.

To make handling easier, it is proposed that the actuating element is arranged on the housing of the teat cup and can be displaced in a longitudinal direction of the housing. In the case of manual handling of the teat cup, the milker grips around the actuating element when attaching the teat cup. When attaching the teat cup, the milker slips the teat cup over the teat, which takes place by an essentially vertically upward movement. Displacement of the actuating element, and consequently triggering of a signal, only occurs when the teat cup has been attached to the teat and the milker continues his or her vertically upward movement, by which the actuating element is displaced in the direction of the opening of the teat cup. When the teat cup is taken off, the milker places his or her hand around the teat cup, thereby also gripping around the actuating element. He or she performs a vertically downward movement, by which the teat cup is pulled off the teat. Before pulling-off of the teat cup from the teat takes place, the actuating element that is being gripped by the milker is moved downward away from the opening of the teat cup, so that the actuating element triggers a further signal. The signal can be processed in the control device of a milking machine and, dependent on the control functions, initiate various operations. In particular, it can be signalled by the signal that the milking operation has been completed and cleaning of the teat cup at least will follow thereafter.

The milking cluster may be a stationary milking cluster. There is also the possibility that the milking cluster is a mobile milking cluster, which can, for example, be connected at corresponding points of a milk line. The corresponding connections then also have a connection to a corresponding control device.

Further details and advantages of the invention are explained on the basis of the exemplary embodiments represented in the drawing, without the subject matter of the invention being restricted to these specific exemplary embodiments.

BRIEF DESCRIPTION OF THE PREFERRED EMBODIMENTS

Figure 2:
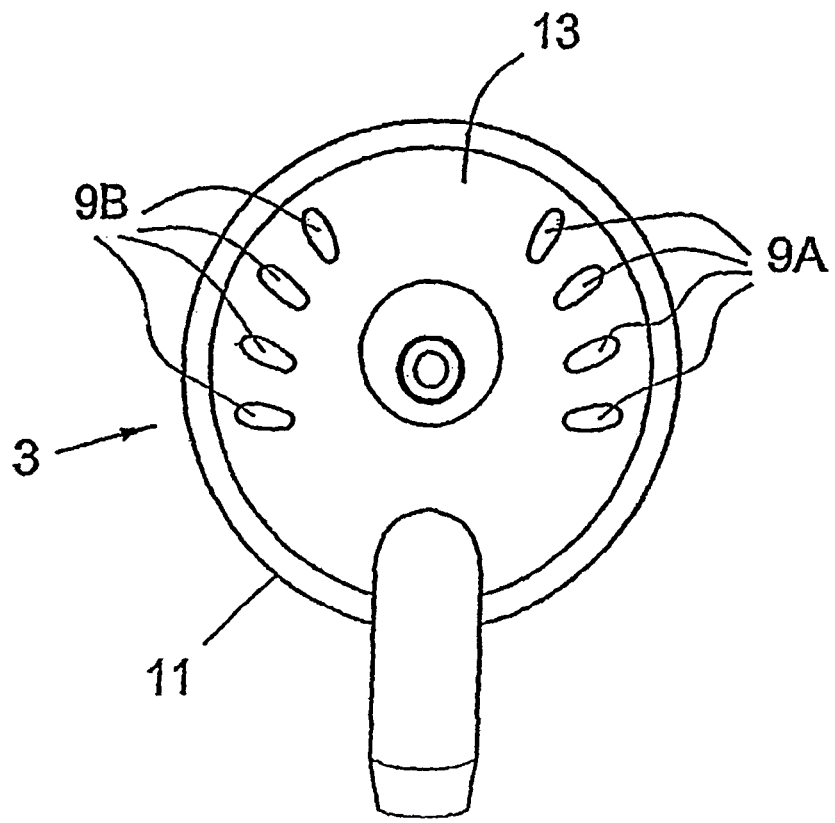

FIG. 1 schematically shows a milking cluster for milking an animal,

FIG. 2 shows an underside of the milk collecting piece and

Figure 3:
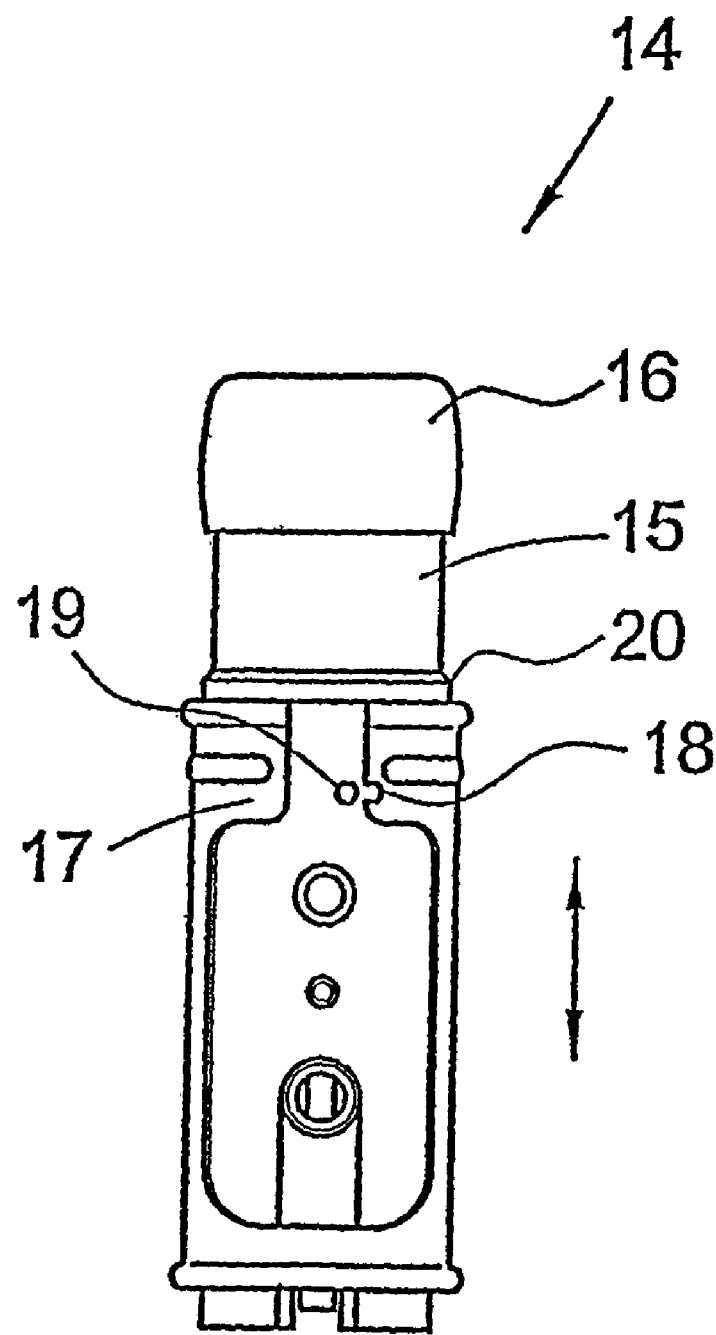

FIG. 3 schematically shows an exemplary embodiment of a teat cup.

DETAILED DESCRIPTION OF THE PREFERRED EMBODIMENTS

In FIG. 1, a milking cluster 1 for milking an animal is represented. The milking cluster 1 comprises teat cups 2 and a milk collecting piece 3. The milk collecting piece 3 is connected via a long milk tube to a milking line (not represented).

The upper side of the milk collecting piece 3 has connection branches for the connection to the teat cups 2. The teat cups 2 are connected to the milk collecting piece 3 via the short milk tubes 5 and via the pulse tubes 6. In the exemplary embodiment represented, the milk collecting piece 3 is connected to a flushing line 7.

The milk collecting piece 3 has a housing 11. Furthermore, the milk collecting piece 3 is configured with an activating unit 8, by means of which at least one activating signal is provided. This activating signal is transmitted to a control device (not represented) of a milking machine. The transmission may take place over a signal line. Alternatively, the signal transmission may take place wirelessly. Depending on the signal, at least one process within the milking machine is performed.

The activating unit 8 can be manually activated. For this purpose, actuating elements 9 are provided on the housing 11 of the milk collecting piece 3. The actuating elements 9 may be buttons, which respond for example to pressure.

In order to prevent an activating signal from being triggered by unintentional actuation of an actuating element 9, in the exemplary embodiment represented an enabling button 10 is provided on the housing 11, on a side wall there of the housing. An activating signal can only be triggered when the enabling button has been actuated. It is preferably necessary that the enabling button 10 is held and an actuating element 9 must be actuated to achieve activation.

There is also the possibility of configuring the activating unit 8 without an enabling button. In the case of such an activating unit, it is proposed that an activating signal is only triggered when a predetermined sequence of actuations of the actuating elements has taken place.

For verification of the activation of the activating unit, a signalling unit 12 is provided on the milk collecting piece. The signalling unit 12 may include, for example, a lamp, which lights up according to the operating state of the activating unit 8. This provides a milker with the possibility of ascertaining without great effort and on the spot whether he or she has for example initiated a milking process by actuation of the actuating element 9. The activating unit 8, and in particular the buttons or actuating elements, are ergonomically arranged. For this purpose, the actuating elements 9 are for example located on an underside 13 of the housing 11 of the milk collecting piece 3, as is represented in FIG. 2.

In the representation shown in FIG. 2, two sets of actuating elements 9a and 9b are provided on the underside 13 of the milk collecting piece 3. The functionalities of the individual actuating elements are the same. A milk collecting piece configured in such a way is ergonomically designed both for right-handed and left-handed people.

The individual actuating elements 9 are preferably formed in such a way that they are in the form of a finger. A configuration of the actuating elements and of the housing in which the actuating elements are arranged in corresponding recesses or depressions, so that the milk collecting piece virtually centers itself in a hand, is particularly preferred.

In FIG. 3, a teat cup 14 is represented. The teat cup 14 has a teat cup sleeve 15, in which a teat rubber is arranged. The teat rubber has a head 16 engaging over the teat cup sleeve 15.

Provided on the teat cup sleeve 15 is as an actuating element 17, which is arranged displaceably in the longitudinal direction of the teat cup sleeve 15. The actuating element 17 has a clearance 18, into which a projection 19 can be introduced. For this purpose, the actuating element 17 can be turned about a longitudinal axis of the teat cup 14.

A collar 20 is provided on the teat cup sleeve 15. The collar 20 surrounds the teat cup sleeve 15. This is not absolutely necessary. There is the possibility that the collar 20 only extends over a predetermined part in the circumferential direction of the teat cup sleeve 15. It is also possible for a number of portions in collar form to be provided.

To attach the teat cup 14 onto a teat of an animal, the milker grips around the teat cup at the actuating element 17. He or she carries out the typical attaching movement. To initiate an activating signal by the actuating element 17, the milker overcomes a force which is determined by the formation of the collar 20 and of the actuating element 17. He or she displaces the actuating element in the direction of the head 16. When such a displacement of the actuating element 17 takes place, an activating signal is triggered.

When the teat cup 14 is taken off, the actuating element 17 is grasped by the milker with one hand and displaced relatively quickly downward away from the head. The downward movement of the actuating element 17 is limited by a stop (not represented). A further signal may be triggered by this movement of the actuating element 17.

The invention provides a milking cluster with an operator interface by which the working steps are made easier for the operator. In particular, there is the possibility of starting the milking process under the udder by actuating the actuating elements. With other actuating elements or by other combinations of actuations of the actuating elements, other processes can also be initiated. These may be, for example, a milking process, a stimulation process, a cleaning process, a premilking or postmilking dipping process or the like.

The invention claimed is:

1. A component of a milking cluster, the milking cluster comprising:
   a teat cup and a milk collecting piece; and the component comprises:
   an activating unit mounted on the milking cluster, and the activating unit generates an activating signal.

2. The component of claim 1, wherein the activating unit is manually activated.

3. The component of claim 2, wherein the activating unit includes an actuating element.

4. The component of claim 3, wherein the activating unit includes an enabling button.

5. The component of claim 1, wherein the activating unit is ergonomically arranged on the milking cluster.

6. The component of claim 1, and further comprising:
   a signalling unit.

7. The component of claim 6, wherein the signalling unit is generates an optical signal.

8. The component of claim 1, wherein the activating unit is mounted on the milk collecting piece.

9. The component of claim 8, wherein the activating unit is mounted on an underside of the milk collecting piece.

10. The component of claim 1, wherein the component actuating unit is mounted on the teat cup.

11. The component of claim 1, wherein the actuating unit is mounted on the milk collecting device and includes a first button arranged to be accessible by right-handed users and a second activating button arranged to be accessible by left-handed users.

12. A component of a milking cluster comprising at least one teat cup and a milk collecting piece, with a housing, characterized in that the component has at least one activating unit, by means of which at least one activating signal is provided, and characterized in that the at least one activating unit can be acoustically activated.

13. A component of a milking cluster comprising at least one teat cup and a milk collecting piece, with a housing, characterized in that the component has at least one activating unit, by means of which at least one activating signal is provided, characterized in that the component is a teat cup and the actuating element is arranged on the housing of the teat cup and can be displaced in a longitudinal direction of the housing.

* * * * *

UNITED STATES PATENT AND TRADEMARK OFFICE
CERTIFICATE OF CORRECTION

PATENT NO.        : 7,793,613 B2
APPLICATION NO.   : 11/661043
DATED             : September 14, 2010
INVENTOR(S)       : Juan Olmedo It is certified that error appears in the above-identified patent and that said Letters Patent is hereby corrected as shown below:

On the Title Page

Under Foreign Patent Documents: "EP 0 468 588 A1   11/1999" should be replaced by
-- EP 0 954 962 A1   11/1999 --.

In Claim 7, the word "is" between "unit" and "generates" should be removed.

Signed and Sealed this
Thirteenth Day of March, 2012

David J. Kappos
*Director of the United States Patent and Trademark Office*